US012702942B2

(12) United States Patent
Burkholder et al.

(10) Patent No.: US 12,702,942 B2
(45) Date of Patent: Aug. 11, 2026

(54) BIODEGRADABLE FILTERS

(71) Applicant: NxtNano, LLC, Lenexa, KS (US)

(72) Inventors: Phillip Ross Burkholder, Tulsa, OK (US); Andrew Albert Lander McDowell, Bucyrus, KS (US); Alan Smithies, Overland Park, KS (US)

(73) Assignee: NxtNano, LLC, Lenexa, KS (US)

( * ) Notice: Subject to any disclaimer, the term of this patent is extended or adjusted under 35 U.S.C. 154(b) by 551 days.

(21) Appl. No.: 17/959,523

(22) Filed: Oct. 4, 2022

(65) Prior Publication Data

US 2023/0108099 A1 Apr. 6, 2023

Related U.S. Application Data

(60) Provisional application No. 63/252,473, filed on Oct. 5, 2021.

(51) Int. Cl.
*B01D 39/08* (2006.01)
*B01D 39/16* (2006.01)
(Continued)

(52) U.S. Cl.
CPC ......... *B01D 39/083* (2013.01); *B01D 39/163* (2013.01); *B01D 46/546* (2013.01); *B32B 5/022* (2013.01); *B32B 5/028* (2013.01); *B32B 5/265* (2021.05); *B32B 5/273* (2021.05); *B32B 7/12* (2013.01); *B01D 39/18* (2013.01); *B01D 2239/025* (2013.01); *B01D 2239/0266* (2013.01); *B01D 2239/0618* (2013.01);
(Continued)

(58) Field of Classification Search
None
See application file for complete search history.

(56) References Cited

U.S. PATENT DOCUMENTS 5,783,505 A 7/1998 Duckett et al.
5,851,937 A 12/1998 Wu et al.
(Continued)

FOREIGN PATENT DOCUMENTS

CN 102675839 12/2016
CN 105597575 3/2018
(Continued)

OTHER PUBLICATIONS

CN211932676U_ENG (Espacenet machine translation of Huang) (Year: 2020).*
(Continued)

*Primary Examiner* — Gabriel E Gitman
(74) *Attorney, Agent, or Firm* — Hovey Williams LLP; Paul J. Walker

(57) ABSTRACT

In order to address the sustainability and environmental issues associated with conventional HVAC filters, inventive HVAC filters have been developed that are completely biodegradable and compostable and exhibit Minimum Efficiency Reporting Value (MERV) ratings that are superior to conventional HVAC filters. More particularly, it has been discovered that biodegradable electrospun nanofibers can be used to produce biodegradable HVAC filters that exhibit superior filtration performance relative to conventional HVAC filters produced from polypropylene electrostatic media or triboelectric nonwoven media.

15 Claims, 2 Drawing Sheets

(51) Int. Cl.

| | |
|---|---|
| ***B01D 46/54*** | (2006.01) |
| ***B32B 5/02*** | (2006.01) |
| ***B32B 5/26*** | (2006.01) |
| ***B32B 7/12*** | (2006.01) |
| *B01D 39/18* | (2006.01) |

(52) U.S. Cl.

CPC ................ *B01D 2239/0631* (2013.01); *B01D 2239/0654* (2013.01); *B01D 2239/0681* (2013.01); *B01D 2239/1233* (2013.01); *B01D 2239/1258* (2013.01); *B01D 2239/1291* (2013.01); *B32B 2250/20* (2013.01); *B32B 2262/0223* (2013.01); *B32B 2262/0276* (2013.01); *B32B 2262/062* (2013.01); *B32B 2262/16* (2021.05); *B32B 2307/7163* (2013.01); *B32B 2307/718* (2013.01); *B32B 2307/724* (2013.01)

(56) References Cited

U.S. PATENT DOCUMENTS

| | | | | |
|---|---|---|---|---|
| 5,905,046 | A | 5/1999 | Takeda et al. | |
| 5,922,110 | A | 7/1999 | Weaver et al. | |
| 6,062,228 | A | 5/2000 | Loercks et al. | |
| 6,075,118 | A | 6/2000 | Wang et al. | |
| 6,515,054 | B1 | 2/2003 | Matsushita et al. | |
| 6,946,506 | B2 | 9/2005 | Bond et al. | |
| 7,364,607 | B2 | 4/2008 | Ueda et al. | |
| 7,972,692 | B2 | 7/2011 | Chakravarty et al. | |
| 7,989,062 | B2 | 8/2011 | Chakravarty et al. | |
| 7,994,078 | B2 | 8/2011 | Reichmann et al. | |
| 8,461,262 | B2 | 6/2013 | Mceneany et al. | |
| 8,609,808 | B2 | 12/2013 | He et al. | |
| 8,927,443 | B2 | 1/2015 | Chakravarty et al. | |
| 9,183,723 | B2 * | 11/2015 | Sherman | F24F 11/526 |
| 9,994,686 | B2 | 6/2018 | Wong et al. | |
| 10,258,918 | B2 | 4/2019 | Maekipaeae et al. | |
| 10,273,612 | B2 | 4/2019 | Song et al. | |
| 10,363,546 | B2 | 7/2019 | Song et al. | |
| 11,672,882 | B1 * | 6/2023 | Oberdorff | A61L 9/205<br>422/121 |
| 2003/0022581 | A1 | 1/2003 | Tsai et al. | |
| 2003/0204027 | A1 | 10/2003 | Autran | |
| 2004/0024141 | A1 | 2/2004 | Hasebe et al. | |
| 2009/0019825 | A1 * | 1/2009 | Skirius | B01D 46/521<br>55/524 |
| 2009/0291607 | A1 | 11/2009 | Wang et al. | |
| 2009/0311937 | A1 | 12/2009 | He et al. | |
| 2010/0048081 | A1 | 2/2010 | Topolkaraev et al. | |
| 2010/0323575 | A1 | 12/2010 | He et al. | |
| 2011/0059669 | A1 | 3/2011 | He et al. | |
| 2012/0135234 | A1 | 5/2012 | Netravali et al. | |
| 2016/0175752 | A1 * | 6/2016 | Jaganathan | B01D 39/1692<br>55/486 |
| 2017/0239032 | A1 | 8/2017 | Sosnowski et al. | |
| 2018/0338525 | A1 | 11/2018 | Sebastian et al. | |
| 2020/0216244 | A1 * | 7/2020 | Pluquet | B29C 45/14811 |
| 2021/0148022 | A1 * | 5/2021 | Kadoma | D04H 3/16 |
| 2021/0322907 | A1 * | 10/2021 | Lagaron Cabello | B01D 39/083 |
| 2021/0370213 | A1 * | 12/2021 | Priorello | B01D 39/1615 |
| 2022/0023784 | A1 * | 1/2022 | Hassounah | B01D 39/2017 |
| 2022/0054964 | A1 * | 2/2022 | Gopal | B01D 46/0032 |

FOREIGN PATENT DOCUMENTS

| | | | | | |
|---|---|---|---|---|---|
| CN | 211932676 | U | * | 11/2020 | |
| CN | 212280032 | U | * | 1/2021 | |
| CN | 112370866 | A | * | 2/2021 | B32B 5/022 |
| JP | H06248511 | | | 9/1994 | |
| JP | 2003260321 | | | 9/2003 | |
| JP | 4409601 | | | 2/2010 | |
| WO | 1999006456 | | | 7/1998 | |
| WO | WO-2021172753 | A1 | * | 9/2021 | D01D 5/0076 |

OTHER PUBLICATIONS

CN212280032U_ENG (Espacenent machine translation of An) (Year: 2021).*

WO2021172753A1_ENG (Espacenet machine translation of Lee) (Year: 2021).*

Camfil Air Filters. (2016). The ASHRAE 52.2-2007 Standard in Air Filtration. Accessed Oct. 29, 2025 at: https://cleanair.camfil.us/2016/06/28/the-ashrae-52-2-2007-standard-in-air-filtration/ (Year: 2016).*

CN112370866A_ENG (Espacenet machine translation of Cai) (Year: 2021).*

* cited by examiner

BIODEGRADABLE FILTERS

RELATED APPLICATION

This application claims the priority benefit under 35 U.S.C. § 119 (e) of U.S. Provisional Patent Application Ser. No. 63/252,473 entitled "BIODEGRADABLE FILTERS," filed Oct. 5, 2021, the entire disclosure of which is incorporated herein by reference.

BACKGROUND

1. Field of the Invention

The present invention generally relates to biodegradable filter constructs. More particularly, the present invention generally relates to a biodegradable filter construct comprising a biodegradable electrospun nanofiber layer formed on a biodegradable substrate.

2. Description of the Related Art

The primary filtration technology used in most current residential and commercial Heating, Ventilation, and Air Conditioning (HVAC) markets today is a disposable product made from a polyester or polypropylene nonwoven with a perforated metal support, which is assembled or housed in a box board or cardboard paper frame. Typically, only the cardboard frame within these conventional HVAC filters is classified as biodegradable.

Generally, residential HVAC filters are composed of a cardboard filter box, a wire scrim backer for pleat stability, a polymeric adhesive for the box and wire, and filter media composed of a variety of polymers, (e.g., polyethylene, polypropylene, PET, etc.), which may be blended. Such contemporary HVAC filters may be produced using textile technologies like meltblowing, carding, and needlepunching, amongst others.

At an average basis weight of 90 gsm, each conventional HVAC filter would use an average of 2.0 square meters of polyester nonwoven, which equates to over 100,000 metric tons of polyester being used that needs to be disposed of per year. Additionally, with the average metal support being around 200 grams per filter, another 1.0 million tons of metal (e.g., steel) per year also needs to be disposed of. Even further, it has been observed that 100 barrels of oil (fossil fuel) is needed to produce 1.0 metric ton of polyester fiber/polymer. Thus, the production and use of conventional HVAC filters has considerable drawbacks from carbon footprint and sustainability perspectives.

Unfortunately, HVAC filters presently available to the residential market generally contain multiple non-biodegradable components that are produced from non-renewable materials. With approximately 140 million households in the United States using an average of four filters per year, this would equate to over 560 million filters with non-biodegradable material per year being used and disposed of either by incineration or disposal in a landfill. Thus, there are currently no commercial HVAC filters that are completely biodegradable and may be simply discarded in a residential or industrial compost pile after use.

SUMMARY

In one or more embodiments, a biodegradable filter is provided. Generally, the biodegradable filter comprises: (a) at least one biodegradable base media layer and (b) at least one biodegradable nanofiber layer disposed on a surface of the biodegradable base media layer comprising a plurality of electrospun nanofibers. Furthermore, the electrospun nanofibers are formed from polycaprolactone, polyvinyl alcohol, polybutylene succinate, polybutylene adipate terephthalate, polylactic acid, a polyhydroxyalkanoate, a polyhydroxybutyrate, poly(3-hydroxybutyrate-co-3-hydroxyvalerate), a cellulose derivative, poly(butylene succinate-co-butylene adipate), or a combination thereof. Moreover, the biodegradable filter exhibits a filtration efficiency of at least MERV 11, as measured according to the ASHRAE 52.2 standard.

In one or more embodiments, a biodegradable and compostable filter is provided. Generally, the biodegradable and compostable filter comprises: (a) at least one biodegradable base media layer and (b) at least one biodegradable nanofiber layer disposed on a surface of the biodegradable base media layer comprising a plurality of electrospun nanofibers having an average diameter of 10 to 500 nm, wherein the biodegradable nanofiber layer has a basis weight of 0.01 to 2.0 gsm. Furthermore, the electrospun nanofibers and the biodegradable base media layer are formed from polycaprolactone, polyvinyl alcohol, polybutylene succinate, polybutylene adipate terephthalate, polylactic acid, a polyhydroxyalkanoate, a polyhydroxybutyrate, poly(3-hydroxybutyrate-co-3-hydroxyvalerate), a cellulose derivative, poly(butylene succinate-co-butylene adipate), or a combination thereof. Moreover, the biodegradable filter exhibits a filtration efficiency of at least MERV 11, as measured according to the ASHRAE 52.2 standard. Additionally, the biodegradable base media layer and the biodegradable nanofiber layer are home compostable as certified by OK Compost Home Certification by TÜV AUSTRIA, Australian Standard AS5810, French Standard NF T51800, or German Standard prEN 17427.

BRIEF DESCRIPTION OF THE FIGURES

Embodiments of the present invention are described herein with reference to the following drawing figures, wherein.

DETAILED DESCRIPTION

In order to address the sustainability and environmental issues associated with conventional HVAC filters, inventive HVAC filters have been developed that are: (1) completely biodegradable and compostable and (2) exhibit Minimum Efficiency Reporting Value (MERV) ratings that are superior to conventional HVAC filters. More particularly, it has been discovered that biodegradable electrospun nanofibers can be used to produce biodegradable HVAC filters that exhibit superior filtration performance relative to conventional HVAC filters produced from polypropylene electrostatic media or triboelectric nonwoven media.

More specifically, due to a burgeoning interest in environmentally friendly practices spanning from manufacturing through end-use, the present disclosure is directed a novel filter construct comprising, consisting essentially of, or consisting of fully biodegradable materials for use in residential and commercial HVAC systems. Furthermore, the inventive biodegradable filter constructs described herein may utilize electrospun nanofiber technology to generate a wide range of efficiency ratings currently used in the industry. Thus, unlike conventional HVAC filters that generally contain a filter media and various non-biodegradable components (e.g., a wire scrim support and/or glue used to set the filter), the inventive biodegradable filters of the present disclosure may be produced entirely from biodegradable and compostable components.

As discussed herein in greater detail, the inventive HVAC filters may be formed entirely using biodegradable polymers, such as polylactic acid (PLA) and/or polyhydroxyalkanoates (PHA), and the filters may not contain any components that are not biodegradable and/or non-renewable. The inventive filter constructs of the present disclosure are discussed in greater detail below. It should be readily understood by one skilled in the art that all of the following embodiments discussed in regard to the filter constructs and the layers therein may be readily combined in any combination, even if the embodiments are listed separately, as long as the combination of the embodiments do not create a conflict.

Figure 1:
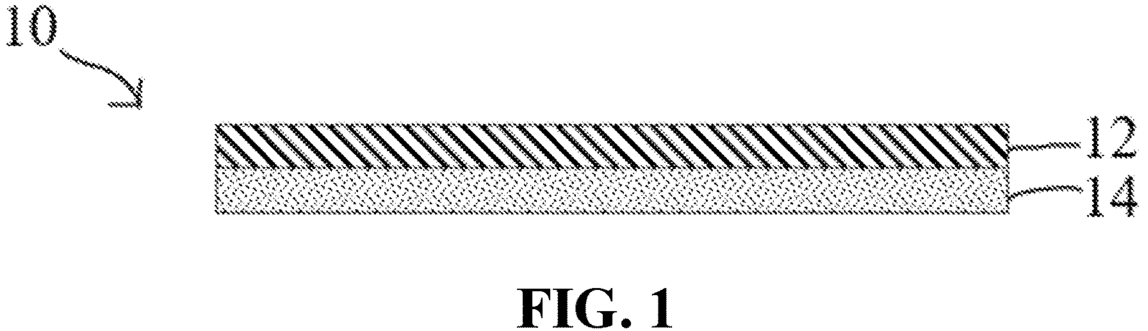
FIG. 1 depicts an exemplary embodiment of the inventive filter construct comprising at least one a biodegradable base media and at least one biodegradable nanofiber layer.

Generally, the basic filter construct 10 of the present disclosure is depicted in FIG. 1.

As shown above in FIG. 1, the inventive filter constructs 10 may comprise, consist essentially of, or consist of at least one a biodegradable base media 12 and at least one biodegradable nanofiber layer 14 disposed on the biodegradable base media 12.

Generally, in various embodiments, the biodegradable base media 12 may comprise a woven or nonwoven material. In certain embodiments, the biodegradable base media 12 may comprise a nonwoven material, such as a spunbonded nonwoven or a carded nonwoven.

Although FIG. 1 depicts the filter construct 10 as comprising a single biodegradable base media 12, it is envisioned that multiple biodegradable base media layers may be present if deemed necessary for certain applications. For example, the filter construct 10 may comprise at least 2, 3, 4, 5, 6, or 7 biodegradable base media layers. Additionally, or alternatively, the filter construct 10 may comprise less than 10, 8, 6, 5, 4, or 3 biodegradable base media layers. The additional biodegradable base media layers may be stacked on each other or may be layered on the opposite side of the nanofiber layer 14.

The polymers forming the biodegradable base media can be made of any known biodegradable polymer known in the art. In various embodiments, the biodegradable base media can be made from polycaprolactone (PCL), polyvinyl alcohol (PVA), polybutylene succinate (PBS), polybutylene adipate terephthalate (PBAT), polylactic acid (PLA), polyhydroxyalkanoates (PHA), polyhydroxybutyrate (PHB), poly(3-hydroxybutyrate-co-3-hydroxyvalerate) (PHBV), cellulose derivatives (e.g., cellulose acetate), poly(butylene succinate-co-butylene adipate) (PBSA), or combinations thereof.

In various embodiments, the biodegradable base media can be made from one or more petrochemical-derived (i.e., non-renewable) polymers that are biodegradable (e.g., PCL, PVA, PBS, PBAT, or a combination thereof).

In various embodiments, the biodegradable base media can be made from one or more bio-based polymers that are biodegradable (e.g., PLA, PHA, PHB, PHBV, or a combination thereof). As used herein, "bio-based" refers to polymers that are directly or indirectly derived from a biological source, such as waste biomass (e.g., wood wastes).

In various embodiments, the biodegradable base media can be made from one or more polymers that are biodegradable and compliant with the home composability requirements of the OK Compost Home Certification by TÜV AUSTRIA (2003), Australian Standard AS5810 (2010), French Standard NF T51800 (2015), and/or German Standard prEN 17427 (2020) (e.g., PHA, PHB, PHBV, cellulose acetate, PBSA, PBAT, or a combination thereof). Such compostable polymers may be derived from renewable sources (e.g., waste biomass) and/or non-renewable sources (e.g., petrochemicals).

In various embodiments, the biodegradable base media can comprise at least 50, 60, 70, 80, 90, 95, or 99 weight percent of one or more biodegradable polymers, such as polycaprolactone (PCL), polyvinyl alcohol (PVA), polybutylene succinate (PBS), polybutylene adipate terephthalate (PBAT), polylactic acid (PLA), polyhydroxyalkanoates (PHA), polyhydroxybutyrate (PHB), poly(3-hydroxybutyrate-co-3-hydroxyvalerate) (PHBV), cellulose derivatives (e.g., cellulose acetate), poly(butylene succinate-co-butylene adipate) (PBSA), or combinations thereof. In certain embodiments, the biodegradable base media can be formed entirely from the aforementioned biodegradable polymers.

In various embodiments, the biodegradable base media can comprise at least 50, 60, 70, 80, 90, 95, or 99 weight percent of one or more biodegradable and home compostable polymers, such as PHA, PHB, PHBV, cellulose acetate, PBSA, PBAT, or a combination thereof. In certain embodiments, the biodegradable base media can be formed entirely from biodegradable and home compostable polymers, such as PHA, PHB, PHBV, cellulose acetate, PBSA, PBAT, or a combination thereof.

In various embodiments, the biodegradable base media can comprise a basis weight of at least 10, 15, 20, 25, 30, 35, or 40 gsm and/or less than 150, 140, 130, 120, 110, 100, or 90 gsm as measured according to ASTM D461. In certain embodiments, the biodegradable base media can comprise a large enough basis weight so as to function as a self-supporting layer that does not require a further support, such as a wire scrim typically used in HVAC filters. In such embodiments, the filter construct 10 may not contain any additional support layers (e.g., a wire scrim, a biodegradable plastic scrim, etc.). If the biodegradable base media is self-supporting, then it can form and support pleat structures without the presence of additional support layers, such as a scrim layer.

The biodegradable fibers forming the biodegradable base media 12 may be monocomponent fibers (i.e., made of a single polymer type and not containing any notable domains). Alternatively, the biodegradable nanofibers may be multicomponent fibers (e.g., sheath/core, side-by-side, etc.) comprising two or more domains comprising different polymer types.

Turning again to FIG. 1, at least one biodegradable nanofiber layer 14 may be deposited onto the biodegradable base media 12. Generally, at least one biodegradable nanofiber layer 14 may be deposited onto the effluent surface and/or the influent surface of the biodegradable base media 12 via electrospinning. In certain embodiments, at least one biodegradable nanofiber layer 14 may be deposited onto the effluent surface of the biodegradable base media 12.

Although FIG. 1 depicts the filter construct 10 as comprising a single biodegradable nanofiber layer 14, it is envisioned that multiple biodegradable nanofiber layers may be present if deemed necessary for certain applications. For example, the filter construct may comprise at least 2, 3, 4, 5, 6, or 7 biodegradable nanofiber layers. Additionally, or alternatively, the filter construct may comprise less than 10, 8, 6, 5, 4, or 3 biodegradable nanofiber layers. The additional biodegradable nanofiber layers 14 may be stacked on each other or may be separately layered on the influent surface and the effluent surface of the biodegradable base media.

In various embodiments, the biodegradable nanofiber layer(s) may comprise, consist essentially of, or consist of a plurality of biodegradable nanofibers. The biodegradable nanofibers may be produced using electrospinning technology. Generally, any conventional electrospinning process known in the art may be used to produce the nanofibers. An exemplary electrospinning process and system are described in U.S. Pat. No. 4,127,706, the entire disclosure of which is incorporated herein by reference. The nanofiber fiber size, nanofiber type, and quantity of nanofibers may vary depending upon the final filter rating that is desired.

In various embodiments, the biodegradable nanofibers forming the nanofiber layer(s) may comprise an average diameter of at least 1, 5, 10, 20, 30, 40, 50, 60, 70, 80, 90, or 100 nm and/or less than 750, 700, 650, 600, 550, 500, 450, 400, 350, 300, or 250 nm.

In various embodiments, the biodegradable nanofiber layers can comprise a basis weight of at least 0.01, 0.05, 0.1, 0.2, 0.5, or 1.0 gsm and/or less than 5.0, 4.0, 3.0, or 2.0 gsm as measured according to ASTM D461.

In various embodiments, the biodegradable nanofibers forming the nanofiber layer(s) may comprise an average diameter of 1 to 1,000 nm, 10 to 500 nm, 20 to 400 nm, 30 to 350 nm, or 40 to 250 nm. Additionally, the biodegradable nanofiber layers can comprise a basis weight of at least 0.01, 0.05, or 0.1 gsm and/or less than 2.0, 1.9, 1.8, 1.7, 1.6, 1.5, 1.4, 1.3, 1.2, 1.1, 1.0, 0.9, 0.8, 0.7, 0.6, or 0.5 gsm, as measured according to ASTM D461

The biodegradable nanofibers forming the nanofiber layer (s) 14 may be monocomponent fibers (i.e., made of a single polymer type and not containing any notable domains). Alternatively, the biodegradable nanofibers may be multi-component fibers (e.g., sheath/core, side-by-side, etc.) comprising two or more domains comprising different polymer types.

The biodegradable nanofibers forming the nanofiber layer (s) can be made from various types of biodegradable polymers such as, for example, polycaprolactone (PCL), polyvinyl alcohol (PVA), polybutylene succinate (PBS), polybutylene adipate terephthalate (PBAT), polylactic acid (PLA), polyhydroxyalkanoates (PHA), polyhydroxybutyrate (PHB), poly(3-hydroxybutyrate-co-3-hydroxyvalerate) (PHBV), cellulose derivatives (e.g., cellulose acetate), poly(butylene succinate-co-butylene adipate) (PBSA), or combinations thereof.

In various embodiments, the biodegradable nanofibers forming the nanofiber layer(s) 14 can be formed with the same biodegradable polymers that are used to form the biodegradable base media 12.

In various embodiments, the biodegradable nanofibers forming the nanofiber layer(s) can be made from one or more petrochemical-derived (i.e., non-renewable) polymers that are biodegradable (e.g., PCL, PVA, PBS, PBAT, or a combination thereof).

In various embodiments, the biodegradable nanofibers forming the nanofiber layer(s) can be made from one or more bio-based polymers that are biodegradable (e.g., PLA, PHA, PHB, PHBV, or a combination thereof).

In various embodiments, the biodegradable nanofibers forming the nanofiber layer(s) can be made from one or more polymers that are biodegradable and compliant with the home composability requirements of the OK Compost Home Certification by TÜV AUSTRIA (2003), Australian Standard AS5810 (2010), French Standard NF T51800 (2015), and/or German Standard prEN 17427 (2020) (e.g., PHA, PHB, PHBV, cellulose acetate, PBSA, PBAT, or a combination thereof). Such compostable polymers may be derived from renewable sources (e.g., waste biomass) and/or non-renewable sources (e.g., petrochemicals).

In various embodiments, the biodegradable nanofibers forming the nanofiber layer(s) can comprise at least 50, 60, 70, 80, 90, 95, or 99 weight percent of one or more biodegradable polymers, such as polycaprolactone (PCL), polyvinyl alcohol (PVA), polybutylene succinate (PBS), polybutylene adipate terephthalate (PBAT), polylactic acid (PLA), polyhydroxyalkanoates (PHA), polyhydroxybutyrate (PHB), poly(3-hydroxybutyrate-co-3-hydroxyvalerate) (PHBV), cellulose derivatives (e.g., cellulose acetate), poly(butylene succinate-co-butylene adipate) (PBSA), or combinations thereof. In certain embodiments, the biodegradable nanofibers can be formed entirely from the aforementioned biodegradable polymers.

In various embodiments, the biodegradable nanofibers forming the nanofiber layer(s) can comprise one or more biodegradable and home compostable polymers, such as PHA, PHB, PHBV, cellulose acetate, PBSA, PBAT, or a combination thereof. In certain embodiments, the nanofiber layer(s) can be formed entirely from biodegradable and home compostable polymers, such as PHA, PHB, PHBV, cellulose acetate, PBSA, PBAT, or a combination thereof.

In various embodiments, the nanofiber layer(s) can comprise at least 50, 60, 70, 80, 90, 95, or 99 weight percent of the biodegradable nanofibers. In certain embodiments, the nanofiber layer(s) may be formed entirely from the biodegradable nanofibers.

Figure 2:
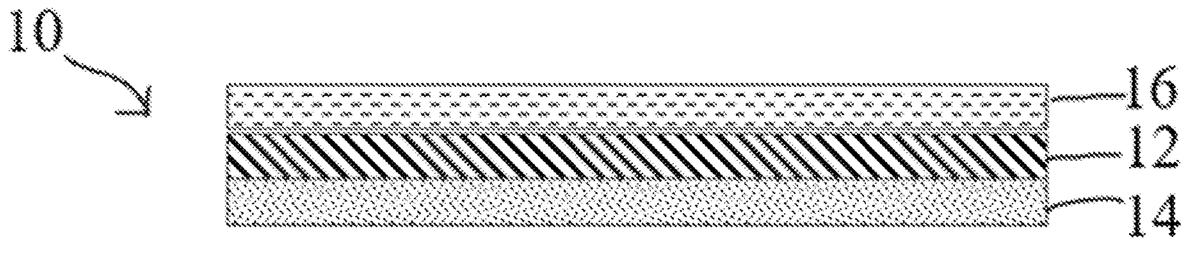
FIG. 2 depicts an exemplary embodiment of the inventive filter construct comprising at least one biodegradable pre-filter layer disposed on a surface of the biodegradable base media.

Turning now to FIG. 2, the filter construct 10 may also contain at least one biodegradable pre-filter layer 16 disposed on a surface of the biodegradable base media 12. The biodegradable pre-filter layer 16 may be placed on the influent surface of the biodegradable base media 12 to capture larger particulates entering the filter.

Generally, in various embodiments, the biodegradable pre-filter layer 16 may comprise a woven or nonwoven material. In certain embodiments, the biodegradable pre-filter layer 16 may comprise a nonwoven material, such as a spunbonded nonwoven or a carded nonwoven.

Although FIG. 2 depicts the filter construct 10 as comprising a single biodegradable pre-filter layer 16, it is envisioned that multiple biodegradable pre-filter layers may be present if deemed necessary for certain applications. For example, the filter construct may comprise at least 2, 3, 4, 5, 6, or 7 biodegradable pre-filter layers. Additionally, or alternatively, the filter construct may comprise less than 10, 8, 6, 5, 4, or 3 biodegradable pre-filter layers. The additional biodegradable pre-filter layers 16 may be stacked on each other and/or may be separately layered on the opposite side of the nanofiber layer 12.

The polymers forming the biodegradable pre-filter layer can be made from any known biodegradable polymer known in the art. In various embodiments, the biodegradable pre-filter layer can be made from polycaprolactone (PCL), polyvinyl alcohol (PVA), polybutylene succinate (PBS), polybutylene adipate terephthalate (PBAT), polylactic acid (PLA), polyhydroxyalkanoates (PHA), polyhydroxybutyrate (PHB), poly(3-hydroxybutyrate-co-3-hydroxyvalerate) (PHBV), cellulose derivatives (e.g., cellulose acetate), poly(butylene succinate-co-butylene adipate) (PBSA), or combinations thereof.

In various embodiments, the biodegradable pre-filter layer can be made from one or more petrochemical-derived (i.e., non-renewable) polymers that are biodegradable (e.g., PCL, PVA, PBS, PBAT, or a combination thereof).

In various embodiments, the biodegradable pre-filter layer can be made from one or more bio-based polymers that are biodegradable (e.g., PLA, PHA, PHB, PHBV, or a combination thereof).

In various embodiments, the biodegradable pre-filter layer can be made from one or more polymers that are biodegradable and compliant with the home composability requirements of the OK Compost Home Certification by TÜV AUSTRIA (2003), Australian Standard AS5810 (2010), French Standard NF T51800 (2015), and/or German Standard prEN 17427 (2020) (e.g., PHA, PHB, PHBV, cellulose acetate, PBSA, PBAT, or a combination thereof). Such compostable polymers may be derived from renewable sources (e.g., waste biomass) and/or non-renewable sources (e.g., petrochemicals).

In various embodiments, the biodegradable pre-filter layer can comprise at least 50, 60, 70, 80, 90, 95, or 99 weight percent of one or more biodegradable polymers, such as polycaprolactone (PCL), polyvinyl alcohol (PVA), polybutylene succinate (PBS), polybutylene adipate terephthalate (PBAT), polylactic acid (PLA), polyhydroxyalkanoates (PHA), polyhydroxybutyrate (PHB), poly(3-hydroxybutyrate-co-3-hydroxyvalerate) (PHBV), cellulose derivatives (e.g., cellulose acetate), poly(butylene succinate-co-butylene adipate) (PBSA), or combinations thereof. In certain embodiments, the biodegradable pre-filter layer can be formed entirely from the aforementioned biodegradable polymers.

In various embodiments, the biodegradable pre-filter layer can comprise at least 50, 60, 70, 80, 90, 95, or 99 weight percent of one or more biodegradable and home compostable polymers, such as PHA, PHB, PHBV, cellulose acetate, PBSA, PBAT, or a combination thereof. In certain embodiments, the biodegradable pre-filter layer can be formed entirely from biodegradable and home compostable polymers, such as PHA, PHB, PHBV, cellulose acetate, PBSA, PBAT, or a combination thereof.

In various embodiments, the biodegradable pre-filter layer can comprise a basis weight of at least 10, 15, 20, 25, 30, 35, or 40 gsm and/or less than 150, 140, 130, 120, 110, 100, or 90 gsm as measured according to ASTM D461.

In various embodiments, the biodegradable base media 12, the nanofiber layer 14, and/or the biodegradable pre-filter layer 16 may be modified so as to be electrostatically charged.

In various embodiments, the biodegradable base media 12, the nanofiber layer 14, and the biodegradable pre-filter layer may all be produced using the same biodegradable polymer.

The biodegradable fibers forming the biodegradable pre-filter layer 16 may be monocomponent fibers (i.e., made of a single polymer type and not containing any notable domains). Alternatively, the biodegradable fibers may be multicomponent fibers (e.g., sheath/core, side-by-side, etc.) comprising two or more domains comprising different polymer types.

Figure 3:
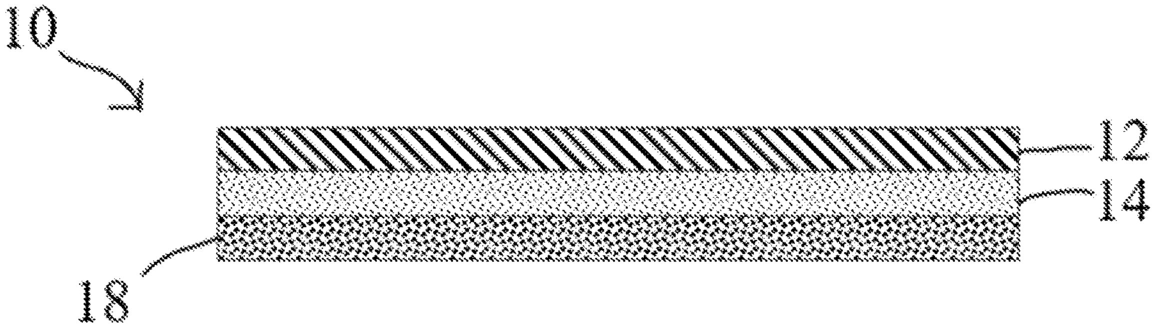
FIG. 3 depicts an exemplary embodiment of the inventive filter construct comprising an optional biodegradable plastic scrim to further reinforce the filter construct.

Turning now to FIG. 3, the filter construct 10 may also contain an optional biodegradable plastic scrim 18 to further reinforce the filter construct 10. The biodegradable plastic scrim 18 would replace conventional metal scrims that are currently being used for HVAC filters. The biodegradable plastic scrim 18 may be placed on the effluent surface of the biodegradable nanofiber layer 14.

The polymers forming the biodegradable plastic scrim 18 can be made from any known biodegradable polymer known in the art. In various embodiments, the biodegradable plastic scrim 18 can be made from polycaprolactone (PCL), polyvinyl alcohol (PVA), polybutylene succinate (PBS), polybutylene adipate terephthalate (PBAT), polylactic acid (PLA), polyhydroxyalkanoates (PHA), polyhydroxybutyrate (PHB), poly(3-hydroxybutyrate-co-3-hydroxyvalerate) (PHBV), cellulose derivatives (e.g., cellulose acetate), poly(butylene succinate-co-butylene adipate) (PBSA), or combinations thereof.

In various embodiments, the biodegradable plastic scrim can be made from one or more petrochemical-derived (i.e., non-renewable) polymers that are biodegradable (e.g., PCL, PVA, PBS, PBAT, or a combination thereof).

In various embodiments, the biodegradable plastic scrim can be made from one or more bio-based polymers that are biodegradable (e.g., PLA, PHA, PHB, PHBV, or a combination thereof).

In various embodiments, the biodegradable plastic scrim can be made from one or more polymers that are biodegradable and compliant with the home composability requirements of the OK Compost Home Certification by TÜV AUSTRIA (2003), Australian Standard AS5810 (2010), French Standard NF T51800 (2015), and/or German Standard prEN 17427 (2020) (e.g., PHA, PHB, PHBV, cellulose acetate, PBSA, PBAT, or a combination thereof). Such compostable polymers may be derived from renewable sources (e.g., waste biomass) and/or non-renewable sources (e.g., petrochemicals).

In various embodiments, the biodegradable base media 12, the nanofiber layer 14, and the biodegradable plastic scrim 18 may all be produced using the same biodegradable polymer. Furthermore, in certain embodiments, the biodegradable polymer(s) used to form the biodegradable base media 12, the nanofiber layer 14, and the biodegradable plastic scrim 18 may comprise unplasticized polymers.

The biodegradable plastic scrim 18 may be considered an optional component, particularly if the biodegradable base media 12 has a sufficient basis weight so as to be self-supporting.

Figure 4:
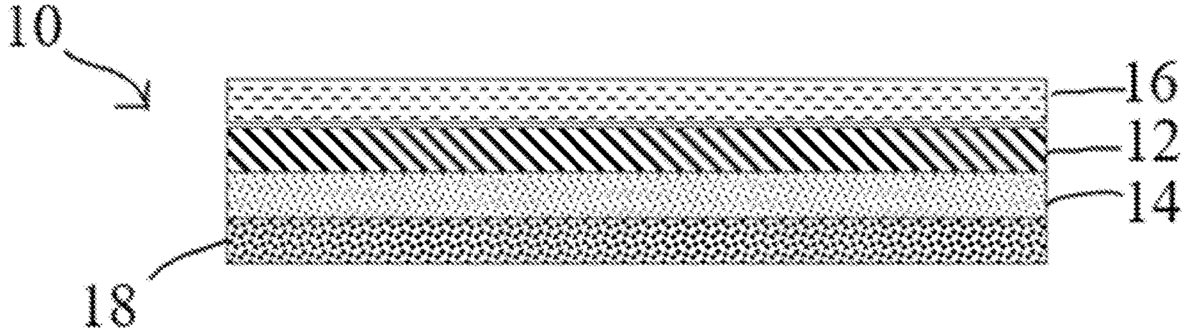
FIG. 4 depicts an exemplary embodiment of the inventive filter construct comprising at least one biodegradable base media, at least one nanofiber layer, at least one biodegradable pre-filter layer, and at least one biodegradable plastic scrim.

As shown in FIG. 4, the filter construct 10 may comprise, consist essentially of, or consist of at least one biodegradable base media 12, at least one nanofiber layer 14, at least one biodegradable pre-filter layer 16, and at least one biodegradable plastic scrim 18.

Although not depicted in FIGS. 1-4, the filter construct 10 may also be encased in an outer cardboard boxing, like conventional residential HVAC filters. The cardboard used for this boxing can be entirely biodegradable and compostable according to the home and/or industrial standards discussed herein. The layers depicted in FIGS. 1-4 may be adhered to each other using techniques known in the art, including through the use of biodegradable adhesives and/or thermal pressing.

Furthermore, the adhesives used to hold together the cardboard boxing and the filter construct (if used) can also be entirely biodegradable. More specifically, a biodegradable hot melt adhesive may be used to form the cardboard boxing and the filter construct.

Generally, in various embodiments, the final filter construct may comprise an overall thickness of at least 0.5, 1, 1.5, or 2 mm and/or less than 20, 15, 10, 5, 4, or 3 mm as measured according to TAPPI 411.

The size of the filter construct may be varied as deemed necessary. Thus, the size of the filter constructs may be modified so as to fit various residential or commercial HVAC needs.

In various embodiments, the filter construct of the present disclosure can comprise, consist essentially of, or consist of the biodegradable components discussed herein (i.e., the biodegradable base media, the biodegradable nanofiber layer, the biodegradable pre-filter layer, the optional biodegradable plastic scrim, and the biodegradable cardboard boxing). Thus, in certain embodiments, the filter media will not contain any non-biodegradable components (e.g., a wire scrim support, non-biodegradable sorbents, non-biodegradable plasticizers, and/or non-biodegradable adhesives).

In various embodiments, the filter construct of the present disclosure can comprise a plurality of pleats so as to form a pleated filter with an increased exposed surface area for HVAC applications.

In various embodiments, the filter construct of the present disclosure can comprise, consist essentially of, or consist of biodegradable components and polymers. As used herein, the term "biodegradable" refers to components and/or polymers that are capable of being broken down by naturally-occurring microorganisms, such as bacteria, fungi, and/or algae. Biodegradability of the filter components and/or polymers may be measured and determined via EN 13432: 2000.

In various embodiments, the filter construct of the present disclosure can comprise, consist essentially of, or consist of biodegradable and compostable components. As used herein, the term "compostable" refers to components and/or polymers that are capable of naturally breaking down while in a compost environment within a period of one year or less. It should be noted that not all biodegradable components are compostable and that only certain biodegradable components and polymers may be considered compostable. In certain embodiments, the filter construct of the present disclosure can comprise, consist essentially of, or consist of components and/or polymers that are considered compostable for industrial composting as measured using ASTM D6400 and certified in the U.S. by the Biodegradable Products Institute (BPI). Additionally, or alternatively, in certain embodiments, the filter construct of the present disclosure can comprise, consist essentially of, or consist of components and/or polymers that are considered "compostable" for residential compositing as certified by the OK Compost Home Certification by TÜV AUSTRIA (2003), Australian Standard AS5810 (2010), French Standard NF T51800 (2015), and/or German Standard prEN 17427 (2020).

In various embodiments, the filter construct of the present disclosure can comprise, consist essentially of, or consist of biodegradable and renewable components. As used herein, the term "renewable" refers to components and/or polymers that are directly or indirectly derived from naturally replenishing sources, such as biomass. Thus, in certain embodiments, the filter media will not contain any polymers derived from non-renewable sources, such as petrochemical sources.

In various embodiments, the filter construct of the present disclosure can comprise, consist essentially of, or consist of biodegradable and recycled components. As used herein, the term "recycled" refers to components and/or polymers that are directly or indirectly derived from recycled products, such as recycled plastics. For example, the polymers forming the components in the inventive filter may be derived directly from a waste source (e.g., waste biodegradable plastics, waste biomass, etc.) and/or indirectly derived from a waste source (e.g., the polymers may be produced from monomers derived from waste sources, such as waste plastics).

In various embodiments, the filter construct of the present disclosure can comprise substantially no sorbents, other particulates for absorbing specific fluids, plasticizers, and/or antimicrobials (e.g., antibacterial additives). For example, the filter construct may comprise less than 1, 0.5, 0.1, 0.05, or 0.01 weight percent of sorbent particulates, plasticizers, and/or antimicrobials.

The combination of the nanofiber layer(s) and the electrostatic filtration technologies can result in a filter construct that exhibits superior filtration characteristics.

In various embodiments, the filter construct of the present disclosure can exhibit a filtration efficiency of at least MERV 11, MERV 12, MERV 13, or MERV 14 and/or less than MERV 16 as measured according to the ASHRAE 52.2 standard. The MERV rating dictates how much dust the filter will hold when it reaches maximum pressure drop. In certain embodiments, the filter construct of the present disclosure exhibits a filtration efficiency of at least MERV 11 or at least MERV 13. In contrast, there are no known conventional HVAC filters that are biodegradable and exhibit a filter efficiency of at least MERV 11. Although not wishing to be bound by theory, it is believed that the superior filtration efficiencies of the inventive filter constructs are due to the use of the electrospun nanofibers, which greatly enhance and facilitate the mechanical filtration properties of the filter.

In various embodiments, the filter construct of the present disclosure can exhibit a filtration efficiency rating of $ePM_{10}$, $ePM_{2.5}$, or $ePM_1$ as measured according to ISO 16890.

In various embodiments, the filter construct of the present disclosure can exhibit superior air filtration performance and may be used for EPA and HEPA filtration. For example, the composite filtration media can exhibit a filter efficiency from E-10 to H-12 as measured using EN1822-2009 and/or from PM1-70 to PM1-85 according to the ISO 16890 test method. Thus, the filter of the present disclosure can present a superior alternative to conventional EPA and HEPA filtration media, such as wetlaid glass media and/or electrostatically charged meltblown nonwovens, which exhibit environmental challenges (e.g., glass fibers) and/or loss in filtration performance via moisture exposure (e.g., meltblown media).

In various embodiments, the filter construct may exhibit an air permeability of at least 5, 10, 15, 20, 25, 30, 35, 40, 45, 50, 55, 60, 65, or 70 and/or less than 400, 300, 200, 175, 150, 125, 110, or 100 cfm at 0.5 inches of water as measured according to ASTM D 737.

As discussed above, the inventive filters may be used in all residential or commercial HVAC applications, including any HVAC application in which conventional HVAC filters are currently being used. The sizes of the filters may be modified in accordance with the desired panel size for HVAC uses (e.g., 20×25×1 inches). Furthermore, particularly if the components and polymers forming the filter constructs are compostable, the filter constructs of the present disclosure may be simply discarded in a residential and/or industrial compositing location. Thus, in certain embodiments, the inventive filter constructs do not need to be discarded to a landfill or other garbage facilities; rather, they can be allowed to naturally break down over time in a conventional compositing location (e.g., a compost heap).

Although the above disclosure primarily focuses on the use of the inventive filter media in HVAC applications, it is envisioned that the filter media may find application in other filtration applications, such as in protective masks, industrial filtration, and power generation, where filters are not generally capable of being disposed and composted thereafter. Thus, the inventive filters may be inserted and used in a HVAC system, a protective mask, an industrial filtration system, or a power generation system.

Definitions

It should be understood that the following is not intended to be an exclusive list of defined terms. Other definitions may be provided in the foregoing description, such as, for example, when accompanying the use of a defined term in context.

As used herein, the terms "a," "an," and "the" mean one or more.

As used herein, the term "and/or," when used in a list of two or more items, means that any one of the listed items can be employed by itself or any combination of two or more of the listed items can be employed. For example, if a composition is described as containing components A, B, and/or C, the composition can contain A alone; B alone; C alone; A and B in combination; A and C in combination, B and C in combination; or A, B, and C in combination.

As used herein, the terms "comprising," "comprises," and "comprise" are open-ended transition terms used to transition from a subject recited before the term to one or more elements recited after the term, where the element or elements listed after the transition term are not necessarily the only elements that make up the subject.

As used herein, the terms "having," "has," and "have" have the same open-ended meaning as "comprising," "comprises," and "comprise" provided above.

As used herein, the terms "including," "include," and "included" have the same open-ended meaning as "comprising," "comprises," and "comprise" provided above.

As used herein, the term "nanofiber" refers to fibers having average diameters of less than 1,000 nm and at least 1 nm.

Numerical Ranges

The present description uses numerical ranges to quantify certain parameters relating to the invention. It should be understood that when numerical ranges are provided, such ranges are to be construed as providing literal support for claim limitations that only recite the lower value of the range as well as claim limitations that only recite the upper value of the range. For example, a disclosed numerical range of 10 to 100 provides literal support for a claim reciting "greater than 10" (with no upper bounds) and a claim reciting "less than 100" (with no lower bounds).

When a numerical sequence is indicated, it is to be understood that each number is modified the same as the first number or last number in the numerical sequence or in the sentence, e.g., each number is "at least," or "up to" or "not more than" as the case may be; and each number is in an "or" relationship. For example, "at least 10, 20, 30, or 40 weight percent . . . " means the same as "at least 10 weight percent, or at least 20 weight percent, or at least 30 weight percent, or at least 40 weight percent."

CLAIMS NOT LIMITED TO DISCLOSED EMBODIMENTS

The preferred forms of the invention described above are to be used as illustration only, and should not be used in a limiting sense to interpret the scope of the present disclosure. Modifications to the exemplary embodiments, set forth above, could be readily made by those skilled in the art without departing from the spirit of the present disclosure.

The inventors hereby state their intent to rely on the Doctrine of Equivalents to determine and assess the reasonably fair scope of the present disclosure as it pertains to any apparatus not materially departing from but outside the literal scope of the invention as set forth in the following claims.

What is claimed is:

1. A biodegradable filter consisting of:

(a) at least one biodegradable base media layer;

(b) at least one biodegradable nanofiber layer disposed on a surface of the at least one biodegradable base media layer comprising a plurality of electrospun nanofibers; and (c) an optional biodegradable plastic scrim disposed on an effluent surface of the at least one biodegradable nanofiber layer, wherein the electrospun nanofibers, the at least one biodegradable base media layer, and the optional biodegradable plastic scrim are formed from polycaprolactone, polyvinyl alcohol, polybutylene succinate, polybutylene adipate terephthalate, polylactic acid, a polyhydroxyalkanoate, a polyhydroxybutyrate, poly(3-hydroxybutyrate-co-3-hydroxyvalerate), a cellulose derivative, poly(butylene succinate-co-butylene adipate), or a combination thereof, wherein the biodegradable filter exhibits a filtration efficiency of at least MERV 11, as measured according to the ASHRAE 52.2 standard, wherein the at least one biodegradable nanofiber layer has a basis weight of 0.01 to 2.0 gsm, wherein the at least one biodegradable base media layer has a basis weight of 10 to 150 gsm.

2. The biodegradable filter according to claim 1, wherein the electrospun nanofibers have an average diameter of 10 to 500 nm.

3. The biodegradable filter according to claim 1, wherein the at least one biodegradable base media layer and the at least one biodegradable nanofiber layer are home compostable as measured by Australian Standard AS5810, French Standard NF T51800, or German Standard prEN 17427.

4. The biodegradable filter according to claim 1, wherein the at least one biodegradable base media layer and the at least one biodegradable nanofiber layer are industrial compostable as measured using ASTM D6400.

5. The biodegradable filter according to claim 1, wherein the biodegradable filter consists of biodegradable and home compostable components.

6. The biodegradable filter according to claim 1, wherein the at least one biodegradable nanofiber layer consists of the electrospun nanofibers.

7. The biodegradable filter according to claim 1, wherein the electrospun nanofibers and the at least one biodegradable base media layer are formed entirely from polylactic acid, a polyhydroxyalkanoate, or a combination thereof.

8. The biodegradable filter according to claim 1, wherein biodegradable filter consists of one biodegradable nanofiber layer and one biodegradable base media layer.

9. A biodegradable and compostable HVAC filter consisting essentially of:

(a) at least one biodegradable base media layer;

(b) at least one biodegradable nanofiber layer disposed on a surface of the at least one biodegradable base media layer comprising a plurality of electrospun nanofibers having an average diameter of 10 to 500 nm;

(c) at least one biodegradable pre-filter layer disposed on an influent surface of the at least one biodegradable base media layer; and (d) an optional biodegradable plastic scrim disposed on an effluent surface of the at least one biodegradable nanofiber layer, wherein the electrospun nanofibers, the at least one biodegradable base media layer, the at least one biodegradable pre-filter layer, and the optional biodegradable plastic scrim are formed from polycaprolactone, polyvinyl alcohol, polybutylene succinate, polybutylene adipate terephthalate, polylactic acid, a polyhydroxyalkanoate, a polyhydroxybutyrate, poly(3-hydroxybutyrate-co-3-hydroxyvalerate), a cellulose derivative, poly(butylene succinate-co-butylene adipate), or a combination thereof, wherein the biodegradable and compostable HVAC filter exhibits a filtration efficiency of at least MERV 11, as measured according to the ASHRAE 52.2 standard, wherein the at least one biodegradable base media layer, the at least one biodegradable nanofiber layer, the at least one biodegradable pre-filter layer, and the optional biodegradable plastic scrim are home compostable as measured by Australian Standard AS5810, French Standard NF T51800, or German Standard prEN 17427, wherein the at least one biodegradable nanofiber layer has a basis weight of 0.01 to 2.0 gsm.

10. The biodegradable and compostable HVAC filter according to claim 9, wherein the electrospun nanofibers and the at least one biodegradable base media layer are formed from polylactic acid, a polyhydroxyalkanoate, or a combination thereof.

11. The biodegradable and compostable HVAC filter according to claim 9, wherein the at least one biodegradable base media layer has a basis weight of 10 to 150 gsm.

12. The biodegradable and compostable HVAC filter according to claim 9, wherein the at least one biodegradable base media layer, the at least one biodegradable nanofiber layer, and the at least one biodegradable pre-filter layer are bonded via a biodegradable adhesive.

13. The biodegradable and compostable HVAC filter according to claim 9, wherein the at least one biodegradable nanofiber layer consists of the electrospun nanofibers.

14. The biodegradable and compostable HVAC filter according to claim 9, further comprising a biodegradable and compostable outer boxing that encases the at least one biodegradable nanofiber layer, the at least one biodegradable base media layer, the at least one biodegradable pre-filter layer, and the optional biodegradable plastic scrim.

15. The biodegradable and compostable HVAC filter according to claim 14, wherein the biodegradable and compostable HVAC filter consists of the at least one biodegradable nanofiber layer, the at least one biodegradable base media layer, the at least one biodegradable pre-filter layer, the optional biodegradable plastic scrim, and the biodegradable and compostable outer boxing.

* * * * *